(12) United States Patent
Lewis

(10) Patent No.: US 10,427,144 B2
(45) Date of Patent: *Oct. 1, 2019

(54) HIGH CHARGE DENSITY METALLOALUMINOPHOSPHOSILICATE MOLECULAR SIEVES MEAPSO-83

(71) Applicant: UOP LLC, Des Plaines, IL (US)

(72) Inventor: Gregory J. Lewis, Santa Cruz, CA (US)

(73) Assignee: UOP LLC, Des Plaines, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/198,189

(22) Filed: Nov. 21, 2018

(65) Prior Publication Data

US 2019/0091671 A1   Mar. 28, 2019

Related U.S. Application Data

(63) Continuation of application No. PCT/US2017/032873, filed on May 16, 2017.

(60) Provisional application No. 62/341,389, filed on May 25, 2016.

(51) Int. Cl.

| | | |
|---|---|---|
| *C01B 39/54* | (2006.01) | |
| *B01J 29/85* | (2006.01) | |
| *B01J 37/16* | (2006.01) | |
| *B01J 37/30* | (2006.01) | |
| *B01J 31/02* | (2006.01) | |
| *C01B 37/08* | (2006.01) | |
| *C10G 29/20* | (2006.01) | |
| *C10G 35/06* | (2006.01) | |
| *C10G 45/12* | (2006.01) | |
| *C10G 45/64* | (2006.01) | |
| *C10G 47/16* | (2006.01) | |
| *C10G 50/00* | (2006.01) | |
| *C10G 3/00* | (2006.01) | |
| *C10G 11/05* | (2006.01) | |
| *B01J 37/00* | (2006.01) | |
| *B01J 37/04* | (2006.01) | |
| *B01J 37/10* | (2006.01) | |
| *C10G 47/20* | (2006.01) | |
| *B01J 29/70* | (2006.01) | |
| *B01J 29/76* | (2006.01) | |
| *C01B 39/48* | (2006.01) | |

(52) U.S. Cl.
CPC ............... *B01J 29/85* (2013.01); *B01J 31/02* (2013.01); *B01J 37/0018* (2013.01); *B01J 37/04* (2013.01); *B01J 37/10* (2013.01); *B01J 37/16* (2013.01); *B01J 37/30* (2013.01); *C01B 37/08* (2013.01); *C01B 39/54* (2013.01); *C10G 3/49* (2013.01); *C10G 11/05* (2013.01); *C10G 29/205* (2013.01); *C10G 35/065* (2013.01); *C10G 45/12* (2013.01); *C10G 45/64* (2013.01); *C10G 47/16* (2013.01); *C10G 47/20* (2013.01); *C10G 50/00* (2013.01); *B01J 29/70* (2013.01); *B01J 29/76* (2013.01); *C01B 39/48* (2013.01); *C01P 2002/74* (2013.01); *C10G 2300/70* (2013.01); *Y02P 30/20* (2015.11)

(58) Field of Classification Search
CPC .......... C01B 39/54; C01B 39/48; B01J 29/85; B01J 29/70; B01J 29/76; B01J 37/16; B01J 37/30; C10G 3/49; C10G 11/05; C10G 29/205; C10G 35/065; C10G 45/12; C10G 45/64; C10G 47/16; C10G 47/20; C10G 50/00; C10G 2300/70; C01P 2002/74
See application file for complete search history.

(56) References Cited

U.S. PATENT DOCUMENTS

| | | | | |
|---|---|---|---|---|
| 8,569,557 | B1 * | 10/2013 | Lewis ...................... | C07C 2/66 585/455 |
| 8,569,558 | B1 * | 10/2013 | Lewis ...................... | C07C 2/66 585/455 |
| 8,696,886 | B1 * | 4/2014 | Lewis ...................... | C07C 2/66 208/109 |
| 8,697,927 | B1 * | 4/2014 | Lewis ...................... | C07C 2/66 585/467 |
| 8,871,177 | B2 * | 10/2014 | Lewis ..................... | C01B 39/54 423/705 |
| 8,871,178 | B2 * | 10/2014 | Lewis ..................... | C01B 39/54 423/277 |
| 8,906,225 | B2 * | 12/2014 | Lewis ...................... | B01J 29/85 208/108 |
| 8,911,614 | B2 * | 12/2014 | Lewis ....................... | C07C 1/20 208/108 |
| 8,911,704 | B2 * | 12/2014 | Lewis ..................... | C07F 19/00 423/305 |

(Continued)

*Primary Examiner* — David M Brunsman

(57) ABSTRACT

A new family of crystalline microporous metalloalumino (gallo)phosphosilicates designated MeAPSO-83 has been synthesized. These metalloalumino(gallo)phosphosilicates are represented by the empirical formula of:

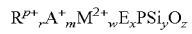

$$R^{p+}_{r}A^{+}_{m}M^{2+}_{w}E_{x}PSi_{y}O_{z}$$

where A is an alkali metal such as potassium, R is an quaternary ammonium cation such as ethyltrimethylammonium, M is a divalent metal such as Zn and E is a trivalent framework element such as aluminum or gallium. This family of metalloalumino(gallo)phosphosilicate materials are stabilized by combinations of alkali and quaternary ammonium cations, enabling unique, high charge density compositions. The MeAPSO-83 family of materials have the BPH topology and have catalytic properties for carrying out various hydrocarbon conversion processes and separation properties for separating at least one component.

18 Claims, No Drawings

(56) References Cited

U.S. PATENT DOCUMENTS

| | | | | |
|---|---|---|---|---|
| 8,933,287 B2* | 1/2015 | Lewis | ............... | C07C 2/66 |
| | | | | 208/110 |
| 8,936,776 B2* | 1/2015 | Lewis | ............... | C01B 39/54 |
| | | | | 423/277 |
| 2017/0252732 A1* | 9/2017 | Lewis | ............... | B01J 29/85 |
| 2017/0252733 A1* | 9/2017 | Lewis | ............... | B01J 29/85 |
| 2017/0252734 A1* | 9/2017 | Lewis | ............... | B01J 29/85 |
| 2017/0341948 A1* | 11/2017 | Lewis | ............... | B01J 29/84 |

* cited by examiner

HIGH CHARGE DENSITY METALLOALUMINOPHOSPHOSILICATE MOLECULAR SIEVES MEAPSO-83

CROSS-REFERENCE TO RELATED APPLICATIONS

This application is a Continuation of International Application No. PCT/US2017/032873 filed May 16, 2017, which application claims priority from U.S. Provisional Application No. 62/341,389 filed May 25, 2016, now expired, the contents of which cited applications are hereby incorporated by reference in their entirety.

FIELD OF THE INVENTION

This invention relates to a new family of high charge density metalloalumino(gallo)-phosphosilicate-based molecular sieves designated MeAPSO-83. They are represented by the empirical formula of:

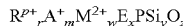

where A is an alkali metal such as potassium, M is a divalent metal such as $Zn^{2+}$, R is a least one quaternary ammonium cation such as ethyltrimethylammonium and E is a trivalent framework element such as aluminum or gallium. The MeAPSO-83 family of materials has the BPH topology and can have "Si islands."

BACKGROUND OF THE INVENTION

Zeolites are crystalline aluminosilicate compositions which are microporous and which are formed from corner sharing $[AlO_{4/2}]^-$ and $SiO_{4/2}$ tetrahedra. Numerous zeolites, both naturally occurring and synthetically prepared are used in various industrial processes. Synthetic zeolites are prepared via hydrothermal synthesis employing suitable sources of Si, Al and structure directing agents (SDAs) such as alkali metals, alkaline earth metals, amines, or organoammonium cations. The structure directing agents reside in the pores of the zeolite and are largely responsible for the particular structure that is ultimately formed. These species balance the framework charge associated with aluminum and can also serve as space fillers. Zeolites are characterized by having pore openings of uniform dimensions, having a significant ion exchange capacity, and being capable of reversibly desorbing an adsorbed phase which is dispersed throughout the internal voids of the crystal without significantly displacing any atoms which make up the permanent zeolite crystal structure. Zeolites can be used as catalysts for hydrocarbon conversion reactions, which can take place on outside surfaces of the zeolite as well as on internal surfaces within the pores of the zeolite.

In 1982, Wilson et al. developed aluminophosphate molecular sieves, the so-called AlPOs, which are microporous materials that have many of the same properties of zeolites, but are silica free, composed of $[AlO_{4/2}]^-$ and $[PO_{4/2}]^+$ tetrahedra (See U.S. Pat. No. 4,319,440). Subsequently, charge was introduced to the neutral aluminophosphate frameworks via the substitution of $SiO_{4/2}$ tetrahedra for $[PO_{4/2}]^+$ tetrahedra to produce the SAPO molecular sieves (See U.S. Pat. No. 4,440,871). Another way to introduce framework charge to neutral aluminophosphates is to substitute $[M^{2+}O_{4/2}]^{2-}$ tetrahedra for $[AlO_{4/2}]^-$ tetrahedra, which yield the MeAPO molecular sieves (see U.S. Pat. No. 4,567,029). These MeAPO materials generally showed low substitution levels of $M^{2+}$ for $Al^{3+}$, generally on the order of 10%, while several materials, notably MeAPO-44 exhibited $M^{2+}$ for $Al^{3+}$ substitution levels of 40%. Later, MeAPO-50 also showed nearly 40% substitution of $M^{2+}$ for $Al^{3+}$, but these examples of high $Me^{2+}$ substitution were few (See Zeolites, 1995, 15, 583-590). It is furthermore possible to introduce framework charge on AlPO-based molecular sieves via the introduction both of $SiO_{4/2}$ and $[M^{2+}O_{4/2}]^{2-}$ tetrahedra to the framework, giving MeAPSO molecular sieves (See U.S. Pat. No. 4,973,785).

Before the SAPO materials of U.S. Pat. No. 4,440,871 were known, there were attempts to make "phosphate zeolites," i.e., substitution of phosphorus for silicon in an aluminosilicate. Such a substitution in an aluminosilicate zeolite, $[PO_{4/2}]^+$ for $[SiO_{4/2}]$, represents a reduction of the negative charge on an aluminosilicate framework. The initial work by Flanigen and Grose co-precipitated the components of silicoaluminophosphate gels, isolated the resulting solid, suspended the resulting solids in alkali hydroxide solutions and treated them under hydrothermal conditions, yielding a series of phosphate zeolites, including those of LTL, CHA, LTA, and GIS topologies (See E. M. Flanigen and R. W. Grose, ADVANCES IN CHEMISTRY, Series No. 101, ACS, Washington D. C., 1971). The low phosphate preparations, P/Al≤1.1, resulted in alkali silicoaluminophosphate species that were not as thermally stable as their aluminosilicate analogs, often less than 350° to 400° C., and reduced adsorption capacity in some cases suggest the possibility of some occluded phosphate in pores and cages. Similarly, Wacks et al. disclose a process for preparing silicoaluminophosphate zeolites that entails digesting hydrated aluminophosphate solids in the presence of sodium silicate solutions to make the desired silicoaluminophosphate materials, in which the claimed range of phosphate incorporation was given by $P_2O_5/Al_2O_3=0-0.2$, suggesting that Al/P≥5 in these materials (See K. Wacks et. al., U.S. Pat. No. 3,443,892). While eight examples of this zeolite synthesis process are disclosed in U.S. Pat. No. 3,443,892, there is no data offered that shows that any P was actually incorporated into the zeolite product, which is possible since the claimed range extends to zero. Many attempts to make silicoaluminophosphate zeolites resembled reactions that would be used to make aluminosilicate zeolites, but carried out in the presence of phosphate, yielding little phosphate incorporation. Kuhl conducted syntheses of silicoaluminophosphate compositions, employing high levels of both phosphate and hydroxide, utilizing a combination of tetramethylammonium and sodium hydroxides for the latter, to make the LTA-related species ZK-21 and ZK-22 (See G. H. Kuhl, Inorganic Chemistry, 10, 1971, p. 2488). These species exhibit low phosphate incorporation, Al/P>8.9, and it was concluded that the phosphate was occluded in zeolitic cages rather than incorporated into the framework. Casci et al. disclose low phosphate chabazite materials in which the framework phosphorus is claimed to be between 0.05-5 mole %, i.e., P/(Al+Si+P)=0.0005–0.05 (See US 2014/0193327). The amount of phosphate employed in the reaction mixtures of the examples are low (Al/P>5.5) and no data is offered in the examples to show what the P incorporation actually is. An outlier disclosed in the SAPO patent (U.S. Pat. No. 4,440,871) uses some sodium aluminate, tetramethylammonium hydroxide and low phosphate (P/Al=0.4) to prepare SAPO-42 (Example 48), which has the LTA topology and a composition similar to that of ZK-21 and ZK-22 mentioned above as Al/P>10. The SAPO-42 product is described by an essential formulation that does not include alkali, since U.S. Pat. No. 4,440,871 only covers compositions of the formulation $mR:(Si_xAl_yP_z)O_2$. This patent also discloses the synthesis of SAPO-20 from the same reaction mixture treated at higher temperature (Example 28). The SAPO-20 product, which has the SOD topology, is not porous, but has a slightly enhanced P content as Al/P=3.17. For many years now, a large gap has been present in the known compositions of microporous silicoaluminophosphates, between the SAPOs disclosed in U.S. Pat. No. 4,440,871 and what are essentially the "phosphate zeolites" reviewed above. In particular, the materials of intermediate silicon and phosphorus levels are missing. These are materials of intermediate charge density, of higher charge density than the SAPOs originating from low level substitution of Si into neutral AlPO frameworks, but lower charge density than the phosphate zeolites.

A similar charge density gap exists for MeAPO-based materials. In the early 1990's, high charge density molecular sieves, similar to the MeAPOs but without the Al, were developed by Bedard (See U.S. Pat. No. 5,126,120) and Gier (See U.S. Pat. No. 5,152,972). These metal phosphates (sometimes arsenates or vanadates) were based on $M^{2+}$ (M=Zn, Co), the general formula of which, in terms of the T-atoms, $T^{2+}$-$T^{5+}$, was approximately $A^+T^{2+}T^{5+}O_4$, having framework charge densities similar to Si/Al=1 zeolites and were charge balanced by alkali cations, $A^+$, in the pores. Later attempts to prepare metallophosphates of similar compositions but with organic SDAs led to porous, but interrupted structures, i.e., the structures contained terminal P—O—H and Zn—N bonds (See J. MATER. CHEM., 1992, 2(11), 1127-1134). Attempts at Al substitution in a zincophosphate network was carried out in the presence of both alkali and quaternary ammonium agents, specifically the most highly charged quaternary ammonium species, tetramethylammonium, but because of the high framework charge density, only the alkali made it into the pores to balance framework charge (See U.S. Pat. No. 5,302,362). Similarly, in a high charge density zincophosphate system that yielded the zinc phosphate analog of zeolite X, the synthesis in the presence of $Na^+$ and $TMA^+$ yielded a product that contained considerably less $TMA^+$ than $Na^+$ (See CHEM. MATER., 1991, 3, 27-29).

To bridge the rather large charge density gap between the MeAPOs of U.S. Pat. No. 4,567,029 and the aforementioned alkali-stabilized $Me^{2+}$-phosphates of Bedard and Gier, Stucky's group developed a synthesis route using amines, often diamines in ethylene glycol. They were able to make high charge density, small pore MeAPOs in which the concentrations of $Co^{2+}$ and $Al^{3+}$ in $R(Co_xAl_{1-x})PO_4$ were varied such that $0.33 \leq x \leq 0.9$ in the so-called ACP series of materials, the aluminum cobalt phosphates (See NATURE, 1997, 388, 735). Continuing with this synthesis methodology utilizing ethylene glycol reaction mixtures and matching the amines to framework charge densities for $R(M^{2+}_xAl_{1-x})PO_4$ such that $0.4 \leq x \leq 0.5$, of ($M^{2+}$=$Mg^{2+}$, $Mn^{2+}$, $Zn^{2+}$, $Co^{2+}$), the large pore materials UCSB-6, -8 and -10 were isolated (See Science, 1997, 278, 2080). Similarly, this approach also yielded MeAPO analogs of zeolite rho of the composition $RM^{2+}_{0.5}Al_{0.5}PO_4$, where R=N,N'-diisopropyl-1,3-propanediamine, $M^{2+}$=me, $Co^{2+}$ and $Mn^{2+}$. Cowley followed this ethylene glycol-based approach, which he described as "predominantly non-aqueous solvothermal conditions" to synthesize a high charge density CoGaPO-5, $(DABCO)_2$ $[Co_4Ga_5P_9O_{36}]$, with the DABCO SDA (See ZEOLITES, 1997, 18, 176-181). Cowley also utilized this strategy to prepare cobalt and zinc gallium phosphates using quinuclidine as the SDA, one of which has the CGS topology with a framework charge density of −0.125/T-atom (See MICROPOROUS AND MESOPOROUS MATERIALS 1999, 28, 163-172). Similarly, Lin and Wang used 1,2 diaminocyclohexane (DACH) with the ethylene glycol approach to prepare a Zn—Ga phosphate of CGS topology with higher Zn incorporation than the Cowley work, realizing a framework charge density of −0.25/T-atom for $(H_2DACH)Zn_2Ga_2(PO_4)_4$ (See CHEMISTRY OF MATERIALS, 2000, 12, 3617-3623). The reliance of this non-aqueous synthesis approach on ethylene glycol solvent does not lend itself well to industrial scale, from both a safety and environmental point of view. This non-aqueous approach also leads to very large crystals, often with dimensions of hundreds of microns, which are too large for industrial use, where µ-sized or smaller crystals are often preferred (See Science, 1997, 278, 2080). Other than this work cited here, there has been little activity in this intermediate charge density region, where $0.2 \leq x \leq 0.9$ for the $[M^{2+}_xAl_{1-x}PO_4]^{x-}$ compositions.

Pursuing aqueous chemistry, Wright used highly charged triquaternary ammonium SDAs to make new MeAPO materials (See CHEM. MATER., 1999, 11, 2456-2462). One of these materials, STA-5 with the BPH topology, $(Mg_{2.1}Al_{11.9}P_{14}O_{28})$, exhibited significant substitution of $Mg^{2+}$ for $Al^{3+}$, up to about 15%, but less substitution than seen in Stucky's non-aqueous ethylene glycol approach.

Unlike the SAPO and MeAPO chemistry discussed in the previous paragraphs, there has been far less investigation in the MeAPSO compositional arena, perhaps because of the complicated nature of this 4-component class of materials. The MeAPO and SAPO materials already consist of 3 T-atom components derived from substitution of $Me^{2+}$ or Si into AlPO-based frameworks, respectively. In the prior art, the addition of the fourth T-atom component, either Si or $Me^{2+}$, has generally been a perturbation of an existing MeAPO or SAPO material. Flanigen et al. review aluminophosphate molecular sieves and the periodic table and discuss the elements that may be substituted into AlPO-based frameworks along with the elements that have been incorporated in 22 different AlPO-based topologies (See Y. Murakami, A. Lijima, J. W. Ward (Eds.), Proc. of $7^{th}$ Int. Zeolite Conf., (Elsevier Amsterdam 1986), p. 103-112). In each case where a MeAPSO composition exists, there is also an AlPO, SAPO, or MeAPO composition except for MeAPSO-46, which was actually found first as a MeAPSO composition, but later found in a MeAPO composition with the same SDA, di-isopropylamine (See J. CHEM. SOC., Faraday Trans., 1993, 89, 4141-4147). There are many examples of MeAPSO compositions that are derivatives of previously known MeAPO or SAPO compositions, for instance of MeAPSO-34, the derivatives often prepared to see the effects on catalytic and other material properties (See APPLIED CATALYSIS A, General 2011 406, 59-62). However, the MeAPSO compositions have not been the focus of new exploratory synthesis. For instance, the attempts to make higher charge density metalloaluminophosphates by Stucky, Cowley and others discussed above have not been extended to MeAPSO compositions. Hence, more than the MeAPOs and SAPOs discussed above, there is a lack of MeAPSO compositions of intermediate to high charge density, in other words, MeAPSOs that contain significant amounts of $Me^{2+}$, $Si^{4+}$, or both, above the minor to modest substitution levels described in U.S. Pat. No. 4,973,785. In short, the compositions of MeAPSO materials have not progressed from what was disclosed in U.S. Pat. No. 4,973,785.

More recently, Lewis et al. developed aqueous solution chemistry leading to higher charge density SAPO, MeAPO, and MeAPSO materials, enabling greater substitution of $SiO_{4/2}$ and $[M^{2+}O_{4/2}]^{2-}$ into the framework for $[PO_{4/2}]^+$ and $[AlO_{4/2}]^-$, respectively, using the ethyltrimethylammonium ($ETMA^+$) and diethyldimethylammonium ($DEDMA^+$)

SDAs. These materials include MeAPO, SAPO, and MeAPSO versions of ZnAPO-57 (U.S. Pat. No. 8,871,178), ZnAPO-59 (U.S. Pat. No. 8,871,177) and ZnAPO-67 (U.S. Pat. No. 8,697,927), as well as the species MeAPSO-64 of BPH topology (U.S. Pat. No. 8,696,886), which was not realized as a MeAPO or SAPO composition with these SDAs. The relationship between the increasing product charge densities and reaction parameters, namely the ETMAOH(DEDMAOH)/H$_3$PO$_4$ ratios, were outlined in the literature (See MICROPOROUS AND MESOPOROUS MATERIALS, 189, 2014, 49-63).

Applicants have now synthesized a new family of charged metalloalumino(gallo)-phosphosilicate framework materials designated MeAPSO-83 with the BPH topology. MeAPSO-83 exhibits higher charge densities than the MeAPSOs mentioned in U.S. Pat. No. 4,973,785 or MeAPSO-64, most notably containing either more Me$^{2+}$, more Si$^{4+}$ or both. The high charge density (HCD) MeAPSOs of this invention are synthesized in a mixed quaternary ammonium/alkali SDA system, for example ETMA$^+$/K$^+$. The utility of alkali in ALPO-based systems is uncommon and is required here to achieve the higher charge density and higher Me$^{2+}$ and Si$^{4+}$ incorporation. The MeAPSO materials of this invention often contain "Si islands," regions of "Si—O—Si" bonding.

SUMMARY OF THE INVENTION

As stated, the present invention relates to a new family of metalloalumino(gallo)-phosphosilicate molecular sieves designated MeAPSO-83. Accordingly, one embodiment of the invention is a microporous crystalline material having a three-dimensional framework of [MO$_{4/2}$]$^{2-}$, [EO$_{4/2}$]$^-$, [PO$_{4/2}$]$^+$ and SiO$_{4/2}$ tetrahedral units and an empirical composition in the as synthesized form and on an anhydrous basis expressed by an empirical formula of:

$$R^{p+}_r A^+_m M^{2+}_w E_x PSi_y O_z$$

where R is an organoammonium cation selected from the group consisting of ethyltrimethylammonium (ETMA$^+$), hexamethonium (RM$^{2+}$), choline [Me$_3$NCH$_2$CH$_2$OH]$^+$, trimethylpropylammonium, trimethylisopropylammonium, trimethylbutylammonium, tetramethylammonium (TMA$^+$), diethyldimethylammonium (DEDMA$^+$), tetraethylammonium (TEA$^+$), tetrapropylammonium (TPA$^+$) and mixtures thereof, "r" is the mole ratio of R to P and has a value of about 0.1 to about 1.5, "p" is the weighted average valence of R and varies from 1 to 2, A is an alkali metal such as Li$^+$, Na$^+$, K$^+$, Rb$^+$ and Cs$^+$ and mixtures thereof, "m" is the mole ratio of A to P and varies from 0.1 to 1.5, M is a divalent metal selected from the group Zn, Co, Mg, Mn and mixtures thereof, "w" is the mole ratio of M to P and varies from 0.5 to 0.9, E is a trivalent element selected from the group consisting of aluminum and gallium and mixtures thereof, "x" is the mole ratio of E to P and varies from 0.1 to 0.8, "w"≥"x", "y" is the mole ratio of Si to P and varies from 0.02 to about 2.5, and "z" is the mole ratio of O to P and has a value determined by the equation:

$$z=(m+p \cdot r+2 \cdot w+3 \cdot x+5+4 \cdot y)/2$$

and is characterized in that it has the x-ray diffraction pattern having at least the d-spacings and intensities set forth in Table A:

TABLE A

| 2Θ | d (Å) | I/I$_0$ % |
|---|---|---|
| 6.79-6.61 | 12.80-13.36 | s-vs |
| 7.63-7.47 | 11.40-11.82 | m-vs |

TABLE A-continued

| 2Θ | d (Å) | I/I$_0$ % |
|---|---|---|
| 13.34-12.95 | 6.63-6.83 | w-m |
| 13.68-13.28 | 6.47-6.66 | w-m |
| 14.95-14.63 | 5.92-6.05 | w-m |
| 15.64-15.29 | 5.66-5.79 | w-m |
| 19.03-18.63 | 4.66-4.76 | m |
| 20.45-19.89 | 4.34-4.46 | m |
| 21.50-20.98 | 4.13-4.23 | m |
| 24.03-23.58 | 3.70-3.77 | w-m |
| 24.37-23.97 | 3.65-3.71 | m-s |
| 26.75-26.39 | 3.33-3.375 | w-m |
| 27.51-27.04 | 3.24-3.295 | w-m |
| 27.73-27.29 | 3.215-3.265 | w-m |
| 28.59-28.13 | 3.12-3.17 | w-m |
| 28.87-28.45 | 3.09-3.135 | w-m |
| 30.01-29.50 | 2.975-3.025 | m |
| 30.38-29.96 | 2.94-2.98 | m-s |
| 30.92-30.38 | 2.89-2.94 | m |
| 31.36-30.86 | 2.85-2.895 | w |
| 33.67-33.15 | 2.66-2.70 | w-m |
| 34.06-33.67 | 2.63-2.66 | w-m |
| 35.31-34.88 | 2.54-2.57 | w-m |
| 35.97-35.60 | 2.495-2.52 | w |
| 36.73-36.27 | 2.445-2.475 | w |
| 38.35-37.85 | 2.345-2.375 | w |
| 39.95-39.49 | 2.255-2.28 | w |
| 41.09-40.64 | 2.195-2.218 | w |
| 43.25-42.76 | 2.09-2.113 | w-m |
| 43.74-43.17 | 2.068-2.094 | w |
| 49.84-49.27 | 1.828-1.848 | w-m |

Another embodiment of the invention is a process for preparing the crystalline metalloalumino(gallo)phosphosilicate molecular sieve described above. The process comprises forming a reaction mixture containing reactive sources of R, A, E, P, M and Si, and heating the reaction mixture at a temperature of about 60° C. to about 200° C. for a time sufficient to form the molecular sieve, the reaction mixture having a composition expressed in terms of mole ratios of the oxides of:

$$aR_{2/p}O:bA_2O:cMO:E_2O_3:dP_2O_5:eSiO_2:fH_2O$$

where "a" has a value of about 2.1 to about 120, "b" has a value of about 0.1 to about 8, "c" has a value of about 0.25 to about 8, "d" has a value of about 1.69 to about 30, "e" has a value from 0.1 to about 16 and "f" has a value from 50 to about 5000.

Yet another embodiment of the invention is a hydrocarbon conversion process using the above-described molecular sieve as a catalyst. The process comprises contacting at least one hydrocarbon with the molecular sieve at conversion conditions to generate at least one converted hydrocarbon.

Still another embodiment of the invention is a separation process using the crystalline MeAPSO-83 material. The process may involve separating mixtures of molecular species or removing contaminants by contacting a fluid with the MeAPSO-83 molecular sieve. Separation of molecular species can be based either on the molecular size (kinetic diameter) or on the degree of polarity of the molecular species. Removing contaminants may be by ion exchange with the molecular sieve.

DETAILED DESCRIPTION OF THE INVENTION

Applicants have prepared a family of metalloalumino (gallo)phosphosilicate-based molecular sieves designated MeAPSO-83. Compared to other MeAPSO materials in the prior art, the MeAPSO-83 family of materials contains much more Si or more $M^{2+}$ or both and exhibits high framework (FW) charge densities that require the use of alkali cations in addition to quaternary ammonium ions to balance the FW charge. Traditional MeAPSOs, such as those disclosed in U.S. Pat. No. 4,973,785 chiefly use organic-based species for FW charge balance, most often amines, while the use of alkali is avoided. The instant microporous crystalline material (MeAPSO-83) has an empirical composition in the as-synthesized form and on an anhydrous basis expressed by the empirical formula:

$$R^{p+}_r A^+_m M^{2+}_w E_x PSi_y O_z$$

where A is at least one alkali cation and is selected from the group of alkali metals. Specific examples of the A cations include but are not limited to lithium, sodium, potassium, rubidium, cesium and mixtures thereof. R is at least one quaternary ammonium cation, examples of which include but are not limited to ethyltrimethylammonium (ETMA$^+$), hexamethonium (HM$^{2+}$), choline [Me$_3$NCH$_2$CH$_2$OH]$^+$, trimethylpropylammonium, trimethylisopropylammonium, trimethylbutylammonium, diethyldimethylammonium (DEDMA$^+$), tetramethylammonium (TMA$^+$) tetraethylammonium (TEA$^+$), tetrapropylammonium (TPA$^+$) and mixtures thereof and "r" is the mole ratio of R to P and varies from about 0.1 to about 1.5, while "p" is the weighted average valence of R and varies from about 1 to 2. M and E are tetrahedrally coordinated and in the framework, M is a divalent element selected from the group of Zn, Mg, Co, Mn and mixtures thereof, while E is a trivalent element selected from aluminum and gallium and mixtures thereof. The value of "m" is the mole ratio of A to P and varies from 0.1 to about 1.5, "w" is the mole ratio of M to P and varies from 0.5 to 0.9, "x" is mole ratio of E to P and varies from 0.1 to about 0.8 and "w"≥"x". The ratio of silicon to P is represented by "y" which varies from about 0.02 to about 2.5. Lastly, "z" is the mole ratio of O to E and is given by the equation:

$$z = (m + r \cdot p + 2 \cdot w + 3 \cdot x + 5 + 4 \cdot y)/2$$

When only one type of R quaternary ammonium cation is present, then the weighted average valence is just the valence of that cation, e.g., +1 or +2. When more than one R cation is present, the total amount of R is given by the equation:

$$R_r^{p+} = R_{r1}^{(p1)+} + R_{r2}^{(p2)+} + R_{r3}^{(p3)+} + \ldots$$

the weighted average valence "p" is given by:

$$p = \frac{r1 \cdot p1 + r2 \cdot p2 + r3 \cdot p3 + \cdots}{r1 + r2 + r3 + \cdots}$$

The MeAPSO-83 of this invention is characterized by a high charge density compared to that known for most MeAPSO materials and can exhibit significant formation of "Si islands," i.e., Si—O—Si bonding. The FW charge on ideal MeAPSO-83 in terms of the empirical formula given above is −2·"w"−"x"+1 or −2·M−Al+P. The charge on these materials is such that highly charged alkali cations are employed in addition to quaternary ammonium cations to balance the FW charge. Comparing MeAPSO materials to AlPO materials, two substitution mechanisms leading to FW charge are at work compared to the neutral AlPO materials, namely [M$^{2+}$O$_{4/2}$]$^{2-}$ for [AlO$_{4/2}$]$^-$ and [SiO$_{4/2}$] for [PO$_{4/2}$]$^+$. "Si" incorporation is observed in two different ways in the MeAPSO-83 materials. In one case, Si only substitutes for P, adding FW charge in the process as mentioned above. All FW phosphorous must be isolated because it can only be bonded to M or E in the framework via P—O—E(M) bonding, and therefore, the Si substituting for P is also isolated. However, unlike P, Si can also bond to itself through Si—O—Si bonding, forming what are known as "Si islands." "Si islands" are known in the art even for lower charge density materials, for example, for SAPO-56 (See MICROPOROUS AND MESOPOROUS MATERIALS, 28, (1999), 125-137). In the present case of MeAPSO-83, the presence of "Si islands" is apparent when, in terms of the empirical formula describing MeAPSO-83, "w"+"x"<1+"y"

It has also been noted that in the MeAPSO-83 materials that a portion of M$^{2+}$ may also reside in the pores likely in a charge balancing role.

The microporous crystalline metalloalumino(gallo)phosphosilicate MeAPSO-83 is prepared by a hydrothermal crystallization of a reaction mixture prepared by combining reactive sources of R, A, E, phosphorous, M and silicon. A preferred form of the MeAPSO-83 materials is when E is Al. The sources of aluminum include but are not limited to aluminum alkoxides, precipitated aluminas, aluminum metal, aluminum hydroxide, aluminum salts, alkali aluminates and alumina sols. Specific examples of aluminum alkoxides include, but are not limited to aluminum ortho sec-butoxide and aluminum ortho isopropoxide. Sources of M include but are not limited to zinc acetate, zinc chloride, cobalt acetate, cobalt chloride, magnesium acetate, magnesium nitrate, manganese sulfate, manganese acetate and manganese nitrate. Sources of phosphorus include, but are not limited to, orthophosphoric acid, phosphorus pentoxide, and ammonium dihydrogen phosphate. Sources of silica include but are not limited to tetraethylorthosilicate, colloidal silica, alkali silicates and precipitated silica. Sources of the other E elements include but are not limited to precipitated gallium hydroxide, gallium chloride, gallium sulfate or gallium nitrate. Sources of the A metals include the halide salts, nitrate salts, hydroxide salts, acetate salts, and sulfate salts of the respective alkali metals. R is at least one quaternary ammonium cation selected from the group consisting of ethyltrimethylammonium (ETMA$^+$), hexamethonium (HM$^{2+}$), choline [Me$_3$NCH$_2$CH$_2$OH]$^+$, trimethylpropylammonium, trimethylisopropylammonium, trimethylbutylammonium, diethyldimethylammonium (DEDMA$^+$), tetramethylammonium (TMA$^+$) tetraethylammonium (TEA$^+$), tetrapropylammonium (TPA$^+$) and mixtures thereof, and the sources include the hydroxide, chloride, bromide, iodide, acetate and fluoride compounds. Specific examples include without limitation ethyltrimethylammonium hydroxide, ethyltrimethylammonium chloride, hexamethonium dihydroxide, hexamethonium dichloride, choline hydroxide, choline chloride, diethyldimethylammonium chloride, diethyldimethylammonium hydroxide, propyltrimethylammonium chloride and tetramethylammonium chloride. In one embodiment R is ETMA$^+$. In another embodiment, R is DEDMA$^+$. In yet another embodiment, R is a combination of ETMA$^+$ and at least one organoammonium cation selected from the group consisting of choline, DEDMA$^+$, TMA$^+$, HM$^{2+}$, trimethylpropylammonium, TEA$^+$, and TPA$^+$.

The reaction mixture containing reactive sources of the desired components can be described in terms of molar ratios of the oxides by the formula:

$$aR_{2/p}O : bA_2O : cMO : E_2O_3 : dP_2O_5 : eSiO_2 : fH_2O$$

where "a" varies from about 2.1 to about 120, "b" varies from about 0.1 to about 8, "c" varies from about 0.25 to about 8, "d" varies from about 1.69 to about 30, "e" varies from 0.1 to 16 and "f" varies from 50 to 5000. If alkoxides are used, it is preferred to include a distillation or evaporative step to remove the alcohol hydrolysis products. The reaction mixture is now reacted at a temperature of about 60° C. to about 200° C. and preferably from about 95° C. to about 175° C. for a period of about 1 day to about 3 weeks and preferably for a time of about 1 day to about 14 days in a sealed reaction vessel at autogenous pressure. After crystallization is complete, the solid product is isolated from the heterogeneous mixture by means such as filtration or centrifugation, and then washed with deionized water and dried in air at ambient temperature up to about 100° C. MeAPSO-83 seeds can optionally be added to the reaction mixture in order to accelerate or otherwise enhance the formation of the desired microporous composition.

The MeAPSO-83 metalloalumino(gallo)phosphosilicate-based material, which is obtained from the above-described process, is characterized by the x-ray diffraction pattern, having at least the d-spacings and relative intensities set forth in Table A below.

TABLE A

| 2Θ | d (Å) | I/I$_0$ % |
|---|---|---|
| 6.79-6.61 | 12.80-13.36 | s-vs |
| 7.63-7.47 | 11.40-11.82 | m-vs |
| 13.34-12.95 | 6.63-6.83 | w-m |
| 13.68-13.28 | 6.47-6.66 | w-m |
| 14.95-14.63 | 5.92-6.05 | w-m |
| 15.64-15.29 | 5.66-5.79 | w-m |
| 19.03-18.63 | 4.66-4.76 | m |
| 20.45-19.89 | 4.34-4.46 | m |
| 21.50-20.98 | 4.13-4.23 | m |
| 24.03-23.58 | 3.70-3.77 | w-m |
| 24.37-23.97 | 3.65-3.71 | m-s |
| 26.75-26.39 | 3.33-3.375 | w-m |
| 27.51-27.04 | 3.24-3.295 | w-m |
| 27.73-27.29 | 3.215-3.265 | w-m |
| 28.59-28.13 | 3.12-3.17 | w-m |
| 28.87-28.45 | 3.09-3.135 | w-m |
| 30.01-29.50 | 2.975-3.025 | m |
| 30.38-29.96 | 2.94-2.98 | m-s |
| 30.92-30.38 | 2.89-2.94 | m |
| 31.36-30.86 | 2.85-2.895 | w |
| 33.67-33.15 | 2.66-2.70 | w-m |
| 34.06-33.67 | 2.63-2.66 | w-m |
| 35.31-34.88 | 2.54-2.57 | w-m |
| 35.97-35.60 | 2.495-2.52 | w |
| 36.73-36.27 | 2.445-2.475 | w |
| 38.35-37.85 | 2.345-2.375 | w |
| 39.95-39.49 | 2.255-2.28 | w |
| 41.09-40.64 | 2.195-2.218 | w |
| 43.25-42.76 | 2.09-2.113 | w-m |
| 43.74-43.17 | 2.068-2.094 | w |
| 49.84-49.27 | 1.828-1.848 | w-m |

The MeAPSO-83 may be modified in many ways to tailor it for use in a particular application. Modifications include calcination, ammonia calcinations, ion-exchange, steaming, various acid extractions, ammonium hexafluorosilicate treatment, or any combination thereof, some of which are outlined for the case of UZM-4 in U.S. Pat. No. 6,776,975 B1 which is incorporated by reference in its entirety. In addition, properties that may be modified include porosity, adsorption, framework composition, acidity, thermal stability, ion-exchange capacity, etc.

As synthesized, the MeAPSO-83 material will contain some of the exchangeable or charge balancing cations in its pores. These exchangeable cations can be exchanged for other cations, or in the case of organic cations, they can be removed by heating under controlled conditions. Because MeAPSO-83 is a large pore material, the BPH topology has 12-ring pores along the c-axis, many organic cations may be removed directly by ion-exchange, heating may not be necessary. If heating is necessary to remove organic cations, a preferred method of their removal from the pores is ammonia calcination. Calcination in air converts the organic cations in the pores to protons, which can lead to the loss of some metal, for example Al, from the framework upon exposure to ambient atmospheric water vapor. When the calcination is carried out in an ammonia atmosphere, the organic cation in the pore is replaced by $NH_4^+$ cation and the framework remains intact (See STUDIES IN SURFACE SCIENCE, (2004) vol. 154, p. 1324-1331). Typical conditions for ammonia calcinations include the use of gaseous anhydrous ammonia flowing at a rate of 1.1 l/min while ramping the sample temperature at 5° C./min to 500° C. and holding at that temperature for a time ranging from 5 minutes to an hour. The resulting ammonium/alkali form of MeAPSO-83 has essentially the diffraction pattern of Table A. Once in this form, the ammonia calcined material may be ion-exchanged with $H^+$, $NH_4^+$, alkali metals, alkaline earth metals, transition metals, rare earth metals, or any mixture thereof, to achieve a wide variety of compositions with the MeAPSO-83 framework in superior condition.

When MeAPSO-83 or its modified forms are calcined in air, there can be a loss of metal from the framework, such as Al, which can alter the x-ray diffraction pattern from that observed for the as-synthesized MeAPSO-83 (See STUDIES IN SURFACE SCIENCE, (2004) vol. 154, p. 1324-1331). Typical conditions for the calcination of the MeAPSO-83 sample include ramping the temperature from room temperature to a calcination temperature of 400° to 600° C., preferably a calcination temperature of 450° to 550° C. at a ramp rate of 1 to 5° C./min, preferably a ramp rate of 2 to 4° C./min, the temperature ramp conducted in an atmosphere consisting either of flowing nitrogen or flowing clean dry air, preferably an atmosphere of flowing nitrogen. Once at the desired calcination temperature, if the calcination atmosphere employed during the temperature ramp is flowing clean dry air, it may remain flowing clean dry air. If the calcination atmosphere during the ramp was flowing nitrogen, it may remain flowing nitrogen at the calcination temperature or it may be immediately converted to clean dry air; preferably at the calcination temperature the calcination atmosphere will remain flowing nitrogen for a period of 1 to 10 hours and preferably for a period of 2 to 4 hours before converting the calcination atmosphere to flowing clean dry air. The final step of the calcination is a dwell at the calcination temperature in clean dry air. Whether the calcination atmosphere during the initial temperature ramp was flowing nitrogen or flowing clean dry air, once at the calcination temperature and once the calcination atmosphere is clean dry air, the MeAPSO-83 sample will spend a period of 1 to 24 hours and preferably a period of 2 to 6 hours under these conditions to complete the calcination process.

Methods used to exchange one cation for another are well known in the art and involve contacting the microporous compositions with a solution containing the desired cation (at molar excess) at exchange conditions. Exchange conditions include a temperature of about 15° C. to about 100° C. and a time of about 20 minutes to about 50 hours. Although not preferred, the organic cation can first be removed by heating under controlled conditions.

The crystalline MeAPSO-83 materials of this invention can be used for separating mixtures of molecular species, removing contaminants through ion exchange and catalyzing various hydrocarbon conversion processes. Separation of molecular species can be based either on the molecular size (kinetic diameter) or on the degree of polarity of the molecular species.

The MeAPSO-83 compositions of this invention can also be used as a catalyst or catalyst support in various hydrocarbon conversion processes. Hydrocarbon conversion processes are well known in the art and include cracking, hydrocracking, alkylation of both aromatics and isoparaffin, isomerization, polymerization, reforming, hydrogenation, dehydrogenation, transalkylation, dealkylation, hydration, dehydration, hydrotreating, hydrodenitrogenation, hydrodesulfurization, methanol to olefins, methanation and syngas shift process. Specific reaction conditions and the types of feeds which can be used in these processes are set forth in U.S. Pat. Nos. 4,310,440, 4,440,871 and 5,126,308, which are incorporated by reference. Preferred hydrocarbon conversion processes are those in which hydrogen is a component such as hydrotreating or hydrofining, hydrogenation, hydrocracking, hydrodenitrogenation, hydrodesulfurization, etc.

Hydrocracking conditions typically include a temperature in the range of 400° to 1200° F. (204° to 649° C.), preferably between 600° and 950° F. (316° and 510° C.). Reaction pressures are in the range of atmospheric to about 3,500 psig (24,132 kPa g), preferably between 200 and 3000 psig (1379 and 20,685 kPa g). Contact times usually correspond to liquid hourly space velocities (LHSV) in the range of about 0.1 $hr^{-1}$ to 15 $hr^{-1}$, preferably between about 0.2 and 3 $hr^{-1}$. Hydrogen circulation rates are in the range of 1,000 to 50,000 standard cubic feet (scf) per barrel of charge (178-8,888 std. $m^3/m^3$), preferably between 2,000 and 30,000 scf per barrel of charge (355-5,333 std. $m^3/m^3$). Suitable hydrotreating conditions are generally within the broad ranges of hydrocracking conditions set out above.

The reaction zone effluent is normally removed from the catalyst bed, subjected to partial condensation and vapor-liquid separation and then fractionated to recover the various components thereof. The hydrogen, and if desired some or all of the unconverted heavier materials, are recycled to the reactor. Alternatively, a two-stage flow may be employed with the unconverted material being passed into a second reactor. Catalysts of the subject invention may be used in just one stage of such a process or may be used in both reactor stages.

Catalytic cracking processes are preferably carried out with the MeAPSO-83 composition using feedstocks such as gas oils, heavy naphthas, deasphalted crude oil residua, etc. with gasoline being the principal desired product. Temperature conditions of 850° to 1100° F. (455° C. to 593° C.), LHSV values of 0.5 $hr^{-1}$ to 10 $hr^{-1}$ and pressure conditions of from about 0 to 50 psig (0-345 kPa) are suitable.

Alkylation of aromatics usually involves reacting an aromatic ($C_2$ to $C_{12}$), especially benzene, with a monoolefin to produce a linear alkyl substituted aromatic. The process is carried out at an aromatic:olefin (e.g., benzene:olefin) ratio of between 5:1 and 30:1, a LHSV of about 0.3 to about 6 $hr^{-1}$, a temperature of about 100° to about 250° C. and pressures of about 200 to about 1000 psig (1,379-6,895 kPa). Further details on apparatus may be found in U.S. Pat. No. 4,870,222 which is incorporated by reference.

Alkylation of isoparaffins with olefins to produce alkylates suitable as motor fuel components is carried out at temperatures of 30° to 40° C., pressures from about atmospheric to about 6,894 kPa (1,000 psig) and a weight hourly space velocity (WHSV) of 0.1 $hr^{-1}$ to about 120 $hr^{-1}$. Details on paraffin alkylation may be found in U.S. Pat. Nos. 5,157,196 and 5,157,197, which are incorporated by reference.

The conversion of methanol to olefins is effected by contacting the methanol with the MeAPSO-83 catalyst at conversion conditions, thereby forming the desired olefins. The methanol can be in the liquid or vapor phase with the vapor phase being preferred. Contacting the methanol with the MeAPSO-83 catalyst can be done in a continuous mode or a batch mode with a continuous mode being preferred. The amount of time that the methanol is in contact with the MeAPSO-83 catalyst must be sufficient to convert the methanol to the desired light olefin products. When the process is carried out in a batch process, the contact time varies from about 0.001 to about 1.0 hour and preferably from about 0.01 to about 1.0 hour. The longer contact times are used at lower temperatures while shorter times are used at higher temperatures. Further, when the process is carried out in a continuous mode, the Weight Hourly Space Velocity (WHSV) based on methanol can vary from about 1 $hr^{-1}$ to about 1000 $hr^{-1}$ and preferably from about 1 $hr^{-1}$ to about 100 $hr^{-1}$.

Generally, the process must be carried out at elevated temperatures in order to form light olefins at a fast enough rate. Thus, the process should be carried out at a temperature of about 300° C. to about 600° C., preferably from about 400° C. to about 550° C. and most preferably from about 450° C. to about 525° C. The process may be carried out over a wide range of pressure including autogenous pressure. Thus, the pressure can vary from about 0 kPa (0 psig) to about 1724 kPa (250 psig) and preferably from about 34 kPa (5 psig) to about 345 kPa (50 psig).

Optionally, the methanol feedstock may be diluted with an inert diluent in order to more efficiently convert the methanol to olefins. Examples of the diluents which may be used are helium, argon, nitrogen, carbon monoxide, carbon dioxide, hydrogen, steam, paraffinic hydrocarbons, e.g., methane, aromatic hydrocarbons, e.g., benzene, toluene and mixtures thereof. The amount of diluent used can vary considerably and is usually from about 5 to about 90 mole percent of the feedstock and preferably from about 25 to about 75 mole percent.

The actual configuration of the reaction zone may be any well known catalyst reaction apparatus known in the art. Thus, a single reaction zone or a number of zones arranged in series or parallel may be used. In such reaction zones the methanol feedstock is flowed through a bed containing the MeAPSO-83 catalyst. When multiple reaction zones are used, one or more MeAPSO-83 catalysts may be used in series to produce the desired product mixture. Instead of a fixed bed, a dynamic bed system, e.g., fluidized or moving, may be used. Such a dynamic system would facilitate any regeneration of the MeAPSO-83 catalyst that may be required. If regeneration is required, the MeAPSO-83 catalyst can be continuously introduced as a moving bed to a regeneration zone where it can be regenerated by means such as oxidation in an oxygen containing atmosphere to remove carbonaceous materials.

The following examples are presented in illustration of this invention and are not intended as undue limitations on the generally broad scope of the invention as set out in the appended claims. The products will be designated with the name MeAPSO-83 that contains the suffix "-83" to indicate the "-83" structure (BPH topology) and the prefix that reflects the compositional nature of the product, namely "MeAPSO" for a metalloalumino(gallo)-phosphosilicate, where it is understood that Al may be replaced in part or fully by Ga in any of these examples.

The structure of the MeAPSO-83 compositions of this invention was determined by x-ray analysis. The x-ray patterns presented in the following examples were obtained using standard x-ray powder diffraction techniques. The radiation source was a high-intensity, x-ray tube operated at 45 kV and 35 mA. The diffraction pattern from the copper K-alpha radiation was obtained by appropriate computer based techniques. Flat compressed powder samples were continuously scanned at 2° to 56° (2θ). Interplanar spacings (d) in Angstrom units were obtained from the position of the diffraction peaks expressed as θ where θ is the Bragg angle as observed from digitized data. Intensities were determined from the integrated area of diffraction peaks after subtracting background, "$I_0$" being the intensity of the strongest line or peak, and "I" being the intensity of each of the other peaks.

As will be understood by those skilled in the art the determination of the parameter 2θ is subject to both human and mechanical error, which in combination can impose an uncertainty of about ±0.4° on each reported value of 2θ. This uncertainty is, of course, also manifested in the reported values of the d-spacings, which are calculated from the 2θ values. This imprecision is general throughout the art and is not sufficient to preclude the differentiation of the present crystalline materials from each other and from the compositions of the prior art. In some of the x-ray patterns reported, the relative intensities of the d-spacings are indicated by the notations vs, s, m, and w which represent very strong, strong, medium, and weak, respectively. In terms of 100× $I/I_o$, the above designations are defined as:

$w=0\text{-}15; m=15\text{-}60: s=60\text{-}80$ and $vs=80\text{-}100$

In certain instances the purity of a synthesized product may be assessed with reference to its x-ray powder diffraction pattern. Thus, for example, if a sample is stated to be pure, it is intended only that the x-ray pattern of the sample is free of lines attributable to crystalline impurities, not that there are no amorphous materials present.

In order to more fully illustrate the invention, the following examples are set forth. It is to be understood that the examples are only by way of illustration and are not intended as an undue limitation on the broad scope of the invention as set forth in the appended claims.

EXAMPLE 1

A Teflon beaker was charged with 150.00 g ETMAOH (SACHEM Inc., 20%), to which 6.06 g TEOS (98%) was added and the mixture was stirred for 2 hours with a high speed mixer. The solution was transferred to a sealed Teflon bottle and digested for 2 hours at 95° C. to hydrolyze the TEOS. The reaction mixture was transferred back to a Teflon beaker and 5.79 g of pre-ground aluminum isopropoxide (Sigma-Aldrich, 13.3% Al) was added and dissolved with vigorous stirring. This was followed by the fast dropwise addition of 19.57 g $H_3PO_4$ (85.7%). Separately, 6.26 g $Zn(OAc)_2 \cdot 2H_2O$ was dissolved in 30.30 g de-ionized water. This solution was added to the reaction mixture in a dropwise fashion in four separate aliquots, stirring between each addition. A solution was prepared by dissolving 2.82 g KOAc (99.4%) in 30.30 g de-ionized water. This solution was added dropwise to the reaction mixture in three aliquots and the reaction mixture was homogenized. The reaction mixture was distributed among 7 Teflon-lined autoclaves and digested quiescently at autogenous pressure at temperatures of 95°, 125°, 150°, and 175° C., for either 33 or 149 hours or both. The solid products were isolated by centrifugation, washed with de-ionized water and dried at room temperature. All of the products were found to contain MeAPSO-83 with the BPH topology by powder x-ray diffraction, except three of the products contained a slight impurity. The representative diffraction lines are shown in Table 1 below for the pure MeAPSO-83 product from the 125° C./149 hours digestion. Scanning Electron Microscopy (SEM) showed this product to consist of hexagonal plate crystals ranging from 0.2 to 0.8μ across and about 0.015 to 0.15μ thick. Elemental analysis of this same product showed it was composed of the elemental ratios Al/P=0.43, Zn/P=0.64, Si/P=0.10, K/P=0.39, and N/P=0.18, consistent with the stoichiometry $ETMA_{0.18}K_{0.39}Zn_{0.64}Al_{0.43}PSi_{0.10}$.

TABLE 1

| 2-Θ | d (Å) | $I/I_0$ (%) |
| --- | --- | --- |
| 6.68 | 13.22 | vs |
| 7.56 | 11.69 | vs |
| 13.10 | 6.75 | m |
| 13.39 | 6.61 | m |
| 14.72 | 6.01 | w |
| 15.38 | 5.76 | m |
| 18.76 | 4.73 | m |
| 20.10 | 4.41 | m |
| 21.18 | 4.19 | m |
| 23.77 | 3.74 | w |
| 24.10 | 3.69 | s |
| 26.52 | 3.36 | m |
| 27.24 | 3.27 | m |
| 27.48 | 3.24 | w |
| 28.32 | 3.15 | m |
| 28.58 | 3.12 | m |
| 29.70 | 3.01 | m |
| 30.06 | 2.97 | m |
| 30.56 | 2.92 | m |
| 31.04 | 2.88 | w |
| 31.30 | 2.86 | w |
| 33.38 | 2.68 | m |
| 33.84 | 2.65 | m |
| 35.14 | 2.55 | w |
| 35.82 | 2.51 | w |
| 36.11 | 2.49 | w |
| 36.46 | 2.46 | w |
| 38.08 | 2.36 | w |
| 38.88 | 2.31 | w |
| 39.68 | 2.27 | w |
| 40.84 | 2.21 | w |
| 43.06 | 2.10 | w |
| 43.46 | 2.08 | w |
| 43.82 | 2.06 | w |
| 45.94 | 1.97 | w |
| 49.60 | 1.84 | w |

EXAMPLE 2

A Teflon bottle was charged with 145.00 g DEDMAOH (SACHEM Inc., 20%). A stirbar and 5.17 g TEOS (98%) were added, the bottle sealed and stirred at room temperature for 18 hours to hydrolyze the TEOS. The reaction mixture was then transferred to a Teflon beaker and placed under a high speed stirrer. Pre-ground aluminum isopropoxide (13.2% Al), 4.97 g, was then added and dissolved with stirring. This was followed by the dropwise addition of 16.69 g $H_3PO_4$ (85.7%). Separately, $Zn(OAc)_2 \cdot 2H_2O$, 5.34 g, was dissolved in 25.00 g de-ionized water. This solution was added dropwise to the reaction mixture. Another solution was prepared by dissolving 1.19 g KOAc (99.4%) in 12.44 g de-ionized water. This solution was added dropwise in two steps with a stirring period in between. The final reaction mixture was homogenized for an additional hour.

The reaction mixture was distributed among 7 Teflon-lined autoclaves and digested quiescently at autogenous pressure at temperatures of 95°, 125°, 150°, and 175° C., for either 48 or 167 hours or both. The solid products were isolated by centrifugation, washed with de-ionized water and dried at room temperature. With the exception of the product of the 95° C./177 hours digestion, all of the products were found to contain MeAPSO-83 with the BPH topology as the major product by powder x-ray diffraction, with the 48-hour samples containing a minor impurity. The representative diffraction lines are shown in Table 2 below for the pure MeAPSO-83 product from the 150° C./167 hours digestion. Scanning Electron Microscopy (SEM) showed this product to consist of hexagonal plate crystals ranging from 0.5 to 3μ across and about 0.1 to 1.0μ thick. Elemental analysis of the same product showed it is composed of the following elemental ratios: Al/P=0.50, Zn/P=0.64, Si/P=0.61, K/P=0.32, and N/P=0.38, consistent with the stoichiometry $DEDMA_{0.38}K_{0.32}Zn_{0.64}Al_{0.50}PSi_{0.61}$.

TABLE 2

| 2-Θ | d (Å) | I/I$_0$ (%) |
|---|---|---|
| 6.70 | 13.18 | s |
| 7.56 | 11.68 | vs |
| 10.09 | 8.76 | w |
| 13.10 | 6.75 | w |
| 13.38 | 6.61 | w |
| 14.72 | 6.01 | w |
| 15.38 | 5.76 | m |
| 16.55 | 5.35 | w |
| 18.76 | 4.73 | m |
| 20.12 | 4.41 | m |
| 21.16 | 4.20 | m |
| 23.72 | 3.75 | w |
| 24.08 | 3.69 | m |
| 26.46 | 3.37 | m |
| 27.20 | 3.28 | m |
| 27.42 | 3.25 | w |
| 28.26 | 3.16 | m |
| 28.54 | 3.13 | m |
| 29.64 | 3.01 | m |
| 30.02 | 2.97 | m |
| 30.52 | 2.93 | m |
| 31.00 | 2.88 | w |
| 31.25 | 2.86 | w |
| 33.30 | 2.69 | m |
| 33.78 | 2.65 | m |
| 35.06 | 2.56 | w |
| 35.73 | 2.51 | w |
| 36.37 | 2.47 | w |
| 38.00 | 2.37 | w |
| 39.62 | 2.27 | w |
| 39.94 | 2.26 | w |
| 40.76 | 2.21 | w |
| 42.92 | 2.11 | w |
| 43.36 | 2.09 | w |
| 43.78 | 2.07 | w |
| 49.46 | 1.84 | m |

EXAMPLE 3

A Teflon bottle was charged with 174.00 g DEDMAOH (20%), followed by the addition of 5.17 g TEOS (98%) and a stirbar. The bottle was sealed and the solution was stirred for 18 hours to hydrolyze the TEOS. The reaction mixture was transferred to a Teflon beaker and placed under a high speed stirrer. Pre-ground aluminum isopropoxide (13.2% Al), 4.97 g, was added and dissolved with vigorous stirring. This was followed by the dropwise addition of 16.69 g $H_3PO_4$ (85.7%). Separately, 5.34 g Zn(OAc)$_2$*2H$_2$O was dissolved in 25.00 g de-ionized water and the resulting solution was added to the reaction mixture in a dropwise fashion. While the reaction mixture continued to stir, 1.19 g KOAc (99.4%) was dissolved in 7.88 g de-ionized water. This solution was added dropwise and post-addition the reaction mixture was homogenized further. The reaction mixture was distributed among 7 Teflon-lined autoclaves and digested quiescently at autogenous pressure at temperatures of 95°, 125°, 150°, and 175° C., for either 48 or 168 hours or both. The solid products were isolated by centrifugation, washed with de-ionized water and dried at room temperature. The product of the 95° C./168 hours digestion was identified as MeAPSO-83 with the BPH topology by powder x-ray diffraction. The representative diffraction lines are shown in Table 3 below for this product. Scanning Electron Microscopy (SEM) showed crystals of this MeAPSO-83 product to consist of hexagonal plates 0.1 to 3μ in diameter and ranging from 0.015 to 0.8μ thick. Elemental analysis of the same product showed it is composed of the following elemental ratios: Al/P=0.41, Zn/P=0.85, Si/P=0.10, K/P=0.34, and N/P=0.22, consistent with the stoichiometry $DEDMA_{0.22}K_{0.34}Zn_{0.85}Al_{0.41}PSi_{0.10}$.

TABLE 3

| 2-Θ | d (Å) | I/I$_0$ (%) |
|---|---|---|
| 6.72 | 13.14 | vs |
| 7.58 | 11.66 | m |
| 10.10 | 8.75 | w |
| 13.12 | 6.74 | w |
| 13.41 | 6.60 | w |
| 14.74 | 6.01 | w |
| 15.40 | 5.75 | m |
| 16.55 | 5.35 | w |
| 18.76 | 4.73 | m |
| 20.12 | 4.41 | m |
| 21.16 | 4.20 | m |
| 23.76 | 3.74 | w |
| 24.08 | 3.69 | m |
| 26.50 | 3.36 | m |
| 27.21 | 3.28 | w |
| 27.44 | 3.25 | w |
| 28.30 | 3.15 | w |
| 28.56 | 3.12 | m |
| 29.66 | 3.01 | m |
| 30.06 | 2.97 | m |
| 30.52 | 2.93 | m |
| 30.99 | 2.88 | w |
| 33.34 | 2.69 | w |
| 33.82 | 2.65 | m |
| 35.12 | 2.55 | w |
| 35.74 | 2.51 | w |
| 36.07 | 2.49 | w |
| 36.42 | 2.46 | w |
| 38.00 | 2.37 | w |
| 39.62 | 2.27 | w |
| 39.98 | 2.25 | w |
| 40.78 | 2.21 | w |
| 42.96 | 2.10 | w |
| 43.36 | 2.09 | w |
| 44.04 | 2.05 | w |
| 49.48 | 1.84 | w |

Specific Embodiments

While the following is described in conjunction with specific embodiments, it will be understood that this description is intended to illustrate and not limit the scope of the preceding description and the appended claims.

A first embodiment of the invention is a microporous crystalline material having a three-dimensional framework of $M^{2+}O_{4/2}]^{2-}$, $[EO_{4/2}]^-$ and $[PO_{4/2}]^+$ and $SiO_{4/2}$ tetrahedral units and an empirical composition in the as synthesized form and on an anhydrous basis expressed by an empirical formula of $R^{p+}{}_rA^+{}_mM^{2+}{}_wE_xPSi_yO_z$ where R is at least one quaternary organoammonium cation selected from the group consisting of ethyltrimethylammonium (ETMA$^+$), hexamethonium (HM$^{2+}$), choline [Me$_3$NCH$_2$CH$_2$OH]$^+$, trimethylpropylammonium, trimethylisopropylammonium, trimethylbutylammonium, tetramethylammonium (TMA$^+$), diethyldimethylammonium (DEDMA$^+$), tetraethylammonium (TEA$^+$), tetrapropylammonium (TPA$^+$) and mixtures thereof, "r" is the mole ratio of R to P and has a value of about 0.1 to about 1.5, "p" is the weighted average valence of R and varies from 1 to 2, A is an alkali metal such as Li$^+$, Na$^+$, K$^+$, Rb$^+$ and Cs$^+$ and mixtures thereof, "m" is the mole ratio of A to P and varies from 0.1 to 1.5, M is a divalent metal selected from the group consisting of Zn, Co, Mg, Mn and mixtures thereof, "w" is the mole ratio of M to P and varies from 0.5 to 0.9, E is a trivalent element selected from the group consisting of aluminum and gallium and mixtures thereof, "x" is the mole ratio of E to P and varies from 0.1 to 0.8, "w"≥"x", "y" is the mole ratio of Si to P and varies from 0.02 to about 2.5, and "z" is the mole ratio of O to P and has a value determined by the equation z=(m+p·r+2·w+3·x+5+4·y)/2 and is characterized in that it has the x-ray diffraction pattern having at least the d-spacings and intensities set forth in Table A.

TABLE A

| 2Θ | d (Å) | I/I$_0$ % |
|---|---|---|
| 6.79-6.61 | 12.80-13.36 | s-vs |
| 7.63-7.47 | 11.40-11.82 | m-vs |
| 13.34-12.95 | 6.63-6.83 | w-m |
| 13.68-13.28 | 6.47-6.66 | w-m |
| 14.95-14.63 | 5.92-6.05 | w-m |
| 15.64-15.29 | 5.66-5.79 | w-m |
| 19.03-18.63 | 4.66-4.76 | m |
| 20.45-19.89 | 4.34-4.46 | m |
| 21.50-20.98 | 4.13-4.23 | m |
| 24.03-23.58 | 3.70-3.77 | w-m |
| 24.37-23.97 | 3.65-3.71 | m-s |
| 26.75-26.39 | 3.33-3.375 | w-m |
| 27.51-27.04 | 3.24-3.295 | w-m |
| 27.73-27.29 | 3.215-3.265 | w-m |
| 28.59-28.13 | 3.12-3.17 | w-m |
| 28.87-28.45 | 3.09-3.135 | w-m |
| 30.01-29.50 | 2.975-3.025 | m |
| 30.38-29.96 | 2.94-2.98 | m-s |
| 30.92-30.38 | 2.89-2.94 | m |
| 31.36-30.86 | 2.85-2.895 | w |
| 33.67-33.15 | 2.66-2.70 | w-m |
| 34.06-33.67 | 2.63-2.66 | w-m |
| 35.31-34.88 | 2.54-2.57 | w-m |
| 35.97-35.60 | 2.495-2.52 | w |
| 36.73-36.27 | 2.445-2.475 | w |
| 38.35-37.85 | 2.345-2.375 | w |
| 39.95-39.49 | 2.255-2.28 | w |
| 41.09-40.64 | 2.195-2.218 | w |
| 43.25-42.76 | 2.09-2.113 | w-m |
| 43.74-43.17 | 2.068-2.094 | w |
| 49.84-49.27 | 1.828-1.848 | w-m |

An embodiment of the invention is one, any or all of prior embodiments in this paragraph up through the first embodiment in this paragraph where E is aluminum. An embodiment of the invention is one, any or all of prior embodiments in this paragraph up through the first embodiment in this paragraph where E is gallium. An embodiment of the invention is one, any or all of prior embodiments in this paragraph up through the first embodiment in this paragraph where R is the ethyltrimethylammonium cation, ETMA$^+$. An embodiment of the invention is one, any or all of prior embodiments in this paragraph up through the first embodiment in this paragraph where R is the diethyldimethylammonium cation, DEDMA$^+$. An embodiment of the invention is one, any or all of prior embodiments in this paragraph up through the first embodiment in this paragraph where a crystalline modified form of the microporous crystalline material comprises a three-dimensional framework of [M$^{2+}$O$_{4/2}$]$^{2-}$, [EO$_{4/2}$]$^-$, [PO$_{4/2}$]$^+$ and SiO$_{4/2}$ tetrahedral units and derived by modifying the above crystalline microporous metalloalumino(gallo)phosphosilicate, the modifications including calcination, ammonia calcinations, ion-exchange, steaming, various acid extractions, ammonium hexafluorosilicate treatment, or any combination thereof.

A second embodiment of the invention is a method for preparing a microporous crystalline material having a three-dimensional framework of [M$^{2+}$O$_{4/2}$]$^{2-}$, [EO$_{4/2}$]$^-$ and [PO$_{4/2}$]$^+$ and SiO$_{4/2}$ tetrahedral units and an empirical composition in the as synthesized form and on an anhydrous basis expressed by an empirical formula of $R^{p+}{}_rA^+{}_mM^{2+}{}_wE_xPSi_yO_z$ where R is at least one quaternary organoammonium cation selected from the group consisting of ethyltrimethylammonium (ETMA$^+$), hexamethonium (HM$^{2+}$), choline [Me$_3$NCH$_2$CH$_2$OH]$^+$, trimethylpropylammonium, trimethylisopropylammonium, trimethylbutylammonium, tetramethylammonium (TMA$^+$), diethyldimethylammonium (DEDMA$^+$), tetraethylammonium (TEA$^+$), tetrapropylammonium (TPA$^+$) and mixtures thereof, "r" is the mole ratio of R to P and has a value of about 0.1 to about 1.5, "p" is the weighted average valence of R and varies from 1 to 2, A is an alkali metal such as Li$^+$, Na$^+$, K$^+$, Rb$^+$ and Cs$^+$ and mixtures thereof, "m" is the mole ratio of A to P and varies from 0.1 to 1.5, M is a divalent metal selected from the group Zn, Co, Mg, Mn and mixtures thereof, "w" is the mole ratio of M to P and varies from 0.5 to 0.9, E is a trivalent element selected from the group consisting of aluminum and gallium and mixtures thereof, "x" is the mole ratio of E to P and varies from 0.1 to 0.8, "w"≥"x", "y" is the mole ratio of Si to P and varies from 0.02 to about 2.5, and "z" is the mole ratio of O to P and has a value determined by the equation z=(m+p·r+2·w+3·x+5+4·y)/2 and is characterized in that it has the x-ray diffraction pattern having at least the d-spacings and intensities set forth in Table A

TABLE A

| 2Θ | d (Å) | I/I$_0$ % |
|---|---|---|
| 6.79-6.61 | 12.80-13.36 | s-vs |
| 7.63-7.47 | 11.40-11.82 | m-vs |
| 13.34-12.95 | 6.63-6.83 | w-m |
| 13.68-13.28 | 6.47-6.66 | w-m |
| 14.95-14.63 | 5.92-6.05 | w-m |
| 15.64-15.29 | 5.66-5.79 | w-m |
| 19.03-18.63 | 4.66-4.76 | m |
| 20.45-19.89 | 4.34-4.46 | m |
| 21.50-20.98 | 4.13-4.23 | m |
| 24.03-23.58 | 3.70-3.77 | w-m |
| 24.37-23.97 | 3.65-3.71 | m-s |
| 26.75-26.39 | 3.33-3.375 | w-m |
| 27.51-27.04 | 3.24-3.295 | w-m |
| 27.73-27.29 | 3.215-3.265 | w-m |
| 28.59-28.13 | 3.12-3.17 | w-m |
| 28.87-28.45 | 3.09-3.135 | w-m |
| 30.01-29.50 | 2.975-3.025 | m |
| 30.38-29.96 | 2.94-2.98 | m-s |
| 30.92-30.38 | 2.89-2.94 | m |
| 31.36-30.86 | 2.85-2.895 | w |
| 33.67-33.15 | 2.66-2.70 | w-m |
| 34.06-33.67 | 2.63-2.66 | w-m |
| 35.31-34.88 | 2.54-2.57 | w-m |
| 35.97-35.60 | 2.495-2.52 | w |
| 36.73-36.27 | 2.445-2.475 | w |

TABLE A-continued

| 2Θ | d (Å) | I/I₀ % |
|---|---|---|
| 38.35-37.85 | 2.345-2.375 | w |
| 39.95-39.49 | 2.255-2.28 | w |
| 41.09-40.64 | 2.195-2.218 | w |
| 43.25-42.76 | 2.09-2.113 | w-m |
| 43.74-43.17 | 2.068-2.094 | w |
| 49.84-49.27 | 1.828-1.848 | w-m | the method comprising forming a reaction mixture containing reactive sources of R, A, E, P, M and Si, and heating the reaction mixture at a temperature of about 60° C. to about 200° C. for a time sufficient to form a metalloalumino(gallo) phosphosilicate molecular sieve, the reaction mixture having a composition expressed in terms of mole ratios of the oxides of $aR_{2/p}O$ $bM_2O$ $cMO$ $E_2O_3$ $dP_2O_5$ $eSiO_2$ $fH_2O$ where "a" has a value of about 2.1 to about 120, "b" has a value of about 0.1 to about 8, "c" has a value of about 0.25 to about 8, "d" has a value of about 1.69 to about 30, "e" has a value from 0.1 to about 16 and "f" has a value from 50 to about 5000. An embodiment of the invention is one, any or all of prior embodiments in this paragraph up through the second embodiment in this paragraph where the initial reaction mixture is a clear solution before digestion. An embodiment of the invention is one, any or all of prior embodiments in this paragraph up through the second embodiment in this paragraph where A is selected from the group consisting of $Li^+$, $Na^+$, $K^+$, $Rb^+$ and $Cs^+$ and mixtures thereof and the source of A is selected from the group consisting of halide salts, nitrate salts, acetate salts, sulfate salts, hydroxide salts and mixtures thereof. An embodiment of the invention is one, any or all of prior embodiments in this paragraph up through the second embodiment in this paragraph where M is selected from the group consisting of $Zn^{2+}$, $Mn^{2+}$, $Co^{2+}$ and $Mg^{2+}$ and mixtures thereof and the source of M is selected from the group consisting of halide salts, nitrate salts, acetate salts, sulfate salts and mixtures thereof. An embodiment of the invention is one, any or all of prior embodiments in this paragraph up through the second embodiment in this paragraph where the source of E is selected from the group consisting of aluminum isopropoxide, aluminum sec-butoxide, precipitated alumina, $Al(OH)_3$, alkali aluminate salts, aluminum metal, aluminum halide salts, aluminum sulfate salts, aluminum nitrate salts, precipitated gallium oxyhydroxide, gallium nitrate, gallium sulfate and mixtures thereof. An embodiment of the invention is one, any or all of prior embodiments in this paragraph up through the second embodiment in this paragraph where the silicon source is selected from the group consisting of tetraethylorthosilicate, silicon alkoxides, fumed silica, colloidal silica, alkali silicate salts, precipitated silica and mixtures thereof. An embodiment of the invention is one, any or all of prior embodiments in this paragraph up through the second embodiment in this paragraph where the reaction mixture is reacted at a temperature of about 95° C. to about 175° C. for a time of about 1 day to about 14 days. An embodiment of the invention is one, any or all of prior embodiments in this paragraph up through the second embodiment in this paragraph where R is $ETMA^+$. An embodiment of the invention is one, any or all of prior embodiments in this paragraph up through the second embodiment in this paragraph where R is $DEDMA^+$. An embodiment of the invention is one, any or all of prior embodiments in this paragraph up through the second embodiment in this paragraph further comprising adding MeAPSO-83 seeds to the reaction mixture.

A third embodiment of the invention is a hydrocarbon conversion process comprising contacting a hydrocarbon stream with a catalyst at hydrocarbon conversion conditions to generate at least one converted product, wherein the catalyst is selected from the group consisting of a crystalline microporous MeAPSO-83 material, a crystalline microporous modified MeAPSO-83 material and mixtures thereof, where MeAPSO-83 is a crystalline microporous metalloalumino(gallo)phosphosilicate material having a three-dimensional framework of $[M^{2+}O_{4/2}]^{2-}$, $[EO_{4/2}]^-$ and $[PO_{4/2}]^+$ and $SiO_{4/2}$ tetrahedral units and an empirical composition in the as synthesized form and on an anhydrous basis expressed by an empirical formula of $R^{p+}_rA^+_mM^{2+}_wE_xPSi_yO_z$ where R is at least one quaternary organoammonium cation selected from the group consisting of ethyltrimethylammonium ($ETMA^+$), hexamethonium ($HM^{2+}$), choline $[Me_3NCH_2CH_2OH]^+$, trimethylpropylammonium, trimethylisopropylammonium, trimethylbutylammonium, tetramethylammonium ($TMA^+$), diethyldimethylammonium ($DEDMA^+$), tetraethylammonium ($TEA^+$), tetrapropylammonium ($TPA^+$) and mixtures thereof, "r" is the mole ratio of R to P and has a value of about 0.1 to about 1.5, "p" is the weighted average valence of R and varies from 1 to 2, A is an alkali metal such as $Li^+$, $Na^+$, $K^+$, $Rb^+$ and $Cs^+$ and mixtures thereof, "m" is the mole ratio of A to P and varies from 0.1 to 1.5, M is a divalent metal selected from the group Zn, Co, Mg, Mn and mixtures thereof, "w" is the mole ratio of M to P and varies from 0.5 to 0.9, E is a trivalent element selected from the group consisting of aluminum and gallium and mixtures thereof, "x" is the mole ratio of E to P and varies from 0.1 to 0.8, "w"≥"x", "y" is the mole ratio of Si to P and varies from 0.02 to about 2.5, and "z" is the mole ratio of O to P and has a value determined by the equation $z=(m+p·r+2·w+3·x+5+4·y)/2$ and is characterized in that it has the x-ray diffraction pattern having at least the d-spacings and intensities set forth in Table A

TABLE A

| 2Θ | d (Å) | I/I₀ % |
|---|---|---|
| 6.79-6.61 | 12.80-13.36 | s-vs |
| 7.63-7.47 | 11.40-11.82 | m-vs |
| 13.34-12.95 | 6.63-6.83 | w-m |
| 13.68-13.28 | 6.47-6.66 | w-m |
| 14.95-14.63 | 5.92-6.05 | w-m |
| 15.64-15.29 | 5.66-5.79 | w-m |
| 19.03-18.63 | 4.66-4.76 | m |
| 20.45-19.89 | 4.34-4.46 | m |
| 21.50-20.98 | 4.13-4.23 | m |
| 24.03-23.58 | 3.70-3.77 | w-m |
| 24.37-23.97 | 3.65-3.71 | m-s |
| 26.75-26.39 | 3.33-3.375 | w-m |
| 27.51-27.04 | 3.24-3.295 | w-m |
| 27.73-27.29 | 3.215-3.265 | w-m |
| 28.59-28.13 | 3.12-3.17 | w-m |
| 28.87-28.45 | 3.09-3.135 | w-m |
| 30.01-29.50 | 2.975-3.025 | m |
| 30.38-29.96 | 2.94-2.98 | m-s |
| 30.92-30.38 | 2.89-2.94 | m |
| 31.36-30.86 | 2.85-2.895 | w |
| 33.67-33.15 | 2.66-2.70 | w-m |
| 34.06-33.67 | 2.63-2.66 | w-m |
| 35.31-34.88 | 2.54-2.57 | w-m |
| 35.97-35.60 | 2.495-2.52 | w |
| 36.73-36.27 | 2.445-2.475 | w |
| 38.35-37.85 | 2.345-2.375 | w |
| 39.95-39.49 | 2.255-2.28 | w |
| 41.09-40.64 | 2.195-2.218 | w |
| 43.25-42.76 | 2.09-2.113 | w-m |
| 43.74-43.17 | 2.068-2.094 | w |
| 49.84-49.27 | 1.828-1.848 | w-m | and the crystalline microporous modified MeAPSO-83 consists of a three-dimensional framework of $[M^{2+}O_{4/2}]^{2-}$, $[EO_{4/2}]^-$ and $[PO_{4/2}]^+$ and $SiO_{4/2}$ tetrahedral units derived from MeAPSO-83 via the modification processes of calcination, ammonia calcinations, ion-exchange, steaming, various acid extractions, ammonium hexafluorosilicate treatment, or any combination thereof. An embodiment of the invention is one, any or all of prior embodiments in this paragraph up through the third embodiment in this paragraph wherein the hydrocarbon conversion process is selected from the group consisting of cracking, hydrocracking, alkylation, isomerization, polymerization, reforming, hydrogenation, dehydrogenation, transalkylation, dealkylation, hydration, dehydration, hydrotreating, hydrofining, hydrodenitrogenation, hydrodesulfurization, methanol to olefins, methanation, syngas shift process, olefin dimerization, oligomerization, dewaxing, and combinations thereof.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A microporous crystalline material having a three-dimensional framework of $[M^{2+}O_{4/2}]^{2-}$, $[EO_{4/2}]^-$ and $[PO_{4/2}]^+$ and $SiO_{4/2}$ tetrahedral units and an empirical composition in the as synthesized form and on an anhydrous basis expressed by an empirical formula of:

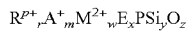

$$R^{p+}_r A^+_m M^{2+}_w E_x PSi_y O_z$$

where R is at least one quaternary organoammonium cation selected from the group consisting of ethyltrimethylammonium (ETMA$^+$), hexamethonium (HM$^{2+}$), choline [Me$_3$NCH$_2$CH$_2$OH]$^+$, trimethylpropylammonium, trimethylisopropylammonium, trimethylbutylammonium, tetramethylammonium (TMA$^+$), diethyldimethylammonium (DEDMA$^+$), tetraethylammonium (TEA$^+$), tetrapropylammonium (TPA$^+$) and mixtures thereof, "r" is the mole ratio of R to P and has a value of about 0.1 to about 1.5, "p" is the weighted average valence of R and varies from 1 to 2, A is an alkali metal such as Li$^+$, Na$^+$, K$^+$, Rb$^+$ and Cs$^+$ and mixtures thereof, "m" is the mole ratio of A to P and varies from 0.1 to 1.5, M is a divalent metal selected from the group consisting of Zn, Co, Mg, Mn and mixtures thereof, "w" is the mole ratio of M to P and varies from 0.5 to 0.9, E is a trivalent element selected from the group consisting of aluminum and gallium and mixtures thereof, "x" is the mole ratio of E to P and varies from 0.1 to 0.8, "w"≥"x", "y" is the mole ratio of Si to P and varies from 0.02 to about 2.5, and "z" is the mole ratio of O to P and has a value determined by the equation:

$$z=(m+p \cdot r+2 \cdot w+3 \cdot x+5+4 \cdot y)/2$$

and is characterized in that it has the x-ray diffraction pattern having at least the d-spacings and intensities set forth in Table A:

TABLE A

| 2Θ | d (Å) | I/I$_0$ % |
|---|---|---|
| 6.79-6.61 | 12.80-13.36 | s-vs |
| 7.63-7.47 | 11.40-11.82 | m-vs |
| 13.34-12.95 | 6.63-6.83 | w-m |
| 13.68-13.28 | 6.47-6.66 | w-m |
| 14.95-14.63 | 5.92-6.05 | w-m |
| 15.64-15.29 | 5.66-5.79 | w-m |
| 19.03-18.63 | 4.66-4.76 | m |
| 20.45-19.89 | 4.34-4.46 | m |
| 21.50-20.98 | 4.13-4.23 | m |
| 24.03-23.58 | 3.70-3.77 | w-m |
| 24.37-23.97 | 3.65-3.71 | m-s |
| 26.75-26.39 | 3.33-3.375 | w-m |
| 27.51-27.04 | 3.24-3.295 | w-m |
| 27.73-27.29 | 3.215-3.265 | w-m |
| 28.59-28.13 | 3.12-3.17 | w-m |
| 28.87-28.45 | 3.09-3.135 | w-m |
| 30.01-29.50 | 2.975-3.025 | m |
| 30.38-29.96 | 2.94-2.98 | m-s |
| 30.92-30.38 | 2.89-2.94 | m |
| 31.36-30.86 | 2.85-2.895 | w |
| 33.67-33.15 | 2.66-2.70 | w-m |
| 34.06-33.67 | 2.63-2.66 | w-m |
| 35.31-34.88 | 2.54-2.57 | w-m |
| 35.97-35.60 | 2.495-2.52 | w |
| 36.73-36.27 | 2.445-2.475 | w |
| 38.35-37.85 | 2.345-2.375 | w |
| 39.95-39.49 | 2.255-2.28 | w |
| 41.09-40.64 | 2.195-2.218 | w |
| 43.25-42.76 | 2.09-2.113 | w-m |
| 43.74-43.17 | 2.068-2.094 | w |
| 49.84-49.27 | 1.828-1.848 | w-m. |

2. The microporous crystalline material of claim 1 where E is aluminum.

3. The microporous crystalline material of claim 1 where E is gallium.

4. The microporous crystalline material of claim 1 where R is the ethyltrimethylammonium cation, ETMA$^+$.

5. The microporous crystalline material of claim 1 where R is the diethyldimethylammonium cation, DEDMA$^+$.

6. A crystalline modified form of the microporous crystalline material of claim 1, comprising a three-dimensional framework of $[M^{2+}O_{4/2}]^{2-}$, $[EO_{4/2}]^-$, $[PO_{4/2}]^+$ and $SiO_{4/2}$ tetrahedral units and derived by modifying the crystalline microporous metalloalumino(gallo)phosphosilicate of claim 1, the modifications including ammonia calcinations, ion-exchange, or the combination thereof.

7. A process for preparing a microporous crystalline material having a three-dimensional framework of $[M^{2+}O_{4/2}]^{2-}$, $[EO_{4/2}]^-$ and $[PO_{4/2}]^+$ and $SiO_{4/2}$ tetrahedral units and an empirical composition in the as synthesized form and on an anhydrous basis expressed by an empirical formula of:

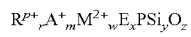

$$R^{p+}_r A^+_m M^{2+}_w E_x PSi_y O_z$$

where R is at least one quaternary organoammonium cation selected from the group consisting of ethyltrimethylammonium (ETMA$^+$), hexamethonium (HM$^{2+}$), choline [Me$_3$NCH$_2$CH$_2$OH]$^+$, trimethylpropylammonium, trimethylisopropylammonium, trimethylbutylammonium, tetramethylammonium (TMA$^+$), diethyldimethylammonium (DEDMA$^+$), tetraethylammonium (TEA$^+$), tetrapropylammonium (TPA$^+$) and mixtures thereof, "r" is the mole ratio of R to P and has a value of about 0.1 to about 1.5, "p" is the weighted average valence of R and varies from 1 to 2, A is an alkali metal such as Li$^+$, Na$^+$, K$^+$, Rb$^+$ and Cs$^+$ and mixtures thereof, "m" is the mole ratio of A to P and varies from 0.1 to 1.5, M is a divalent metal selected from the group Zn, Co, Mg, Mn and mixtures thereof, "w" is the mole ratio of M to P and varies from 0.5 to 0.9, E is a trivalent element selected from the group consisting of aluminum and gallium and mixtures thereof, "x" is the mole ratio of E to P and varies from 0.1 to 0.8, "w"≥"x", "y" is the mole ratio of Si to P and varies from 0.02 to about 2.5, and "z" is the mole ratio of O to P and has a value determined by the equation:

$$z=(m+p\cdot r+2\cdot w+3\cdot x+5+4\cdot y)/2$$

and is characterized in that it has the x-ray diffraction pattern having at least the d-spacings and intensities set forth in Table A:

TABLE A

| 2Θ | d (Å) | I/I$_0$ % |
|---|---|---|
| 6.79-6.61 | 12.80-13.36 | s-vs |
| 7.63-7.47 | 11.40-11.82 | m-vs |
| 13.34-12.95 | 6.63-6.83 | w-m |
| 13.68-13.28 | 6.47-6.66 | w-m |
| 14.95-14.63 | 5.92-6.05 | w-m |
| 15.64-15.29 | 5.66-5.79 | w-m |
| 19.03-18.63 | 4.66-4.76 | m |
| 20.45-19.89 | 4.34-4.46 | m |
| 21.50-20.98 | 4.13-4.23 | m |
| 24.03-23.58 | 3.70-3.77 | w-m |
| 24.37-23.97 | 3.65-3.71 | m-s |
| 26.75-26.39 | 3.33-3.375 | w-m |
| 27.51-27.04 | 3.24-3.295 | w-m |
| 27.73-27.29 | 3.215-3.265 | w-m |
| 28.59-28.13 | 3.12-3.17 | w-m |
| 28.87-28.45 | 3.09-3.135 | w-m |
| 30.01-29.50 | 2.975-3.025 | m |
| 30.38-29.96 | 2.94-2.98 | m-s |
| 30.92-30.38 | 2.89-2.94 | m |
| 31.36-30.86 | 2.85-2.895 | w |
| 33.67-33.15 | 2.66-2.70 | w-m |
| 34.06-33.67 | 2.63-2.66 | w-m |
| 35.31-34.88 | 2.54-2.57 | w-m |
| 35.97-35.60 | 2.495-2.52 | w |
| 36.73-36.27 | 2.445-2.475 | w |
| 38.35-37.85 | 2.345-2.375 | w |
| 39.95-39.49 | 2.255-2.28 | w |
| 41.09-40.64 | 2.195-2.218 | w |
| 43.25-42.76 | 2.09-2.113 | w-m |
| 43.74-43.17 | 2.068-2.094 | w |
| 49.84-49.27 | 1.828-1.848 | w-m | the process comprising forming a reaction mixture containing reactive sources of R, A, E, P, M and Si, and heating the reaction mixture at a temperature of about 60° C. to about 200° C. for a time sufficient to form a metalloalumino(gallo) phosphosilicate molecular sieve, the reaction mixture having a composition expressed in terms of mole ratios of the oxides of:

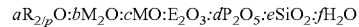

$$aR_{2/p}O:bM_2O:cMO:E_2O_3:dP_2O_5:eSiO_2:fH_2O$$

where "a" has a value of about 2.1 to about 120, "b" has a value of about 0.1 to about 8, "c" has a value of about 0.25 to about 8, "d" has a value of about 1.69 to about 30, "e" has a value from 0.1 to about 16 and "f" has a value from 50 to about 5000.

8. The process of claim 7 where the initial reaction mixture is a clear solution before digestion.

9. The process of claim 7 where A is selected from the group consisting of Li$^+$, Na$^+$, K$^+$, Rb$^+$ and Cs$^+$ and mixtures thereof and the source of A is selected from the group consisting of halide salts, nitrate salts, acetate salts, sulfate salts, hydroxide salts and mixtures thereof.

10. The process of claim 7 where M is selected from the group consisting of Zn$^{2+}$, Mn$^{2+}$, Co$^{2+}$ and Mg$^{2+}$ and mixtures thereof and the source of M is selected from the group consisting of halide salts, nitrate salts, acetate salts, sulfate salts and mixtures thereof.

11. The process of claim 7 where the source of E is selected from the group consisting of aluminum isopropoxide, aluminum sec-butoxide, precipitated alumina, Al(OH)$_3$, alkali aluminate salts, aluminum metal, aluminum halide salts, aluminum sulfate salts, aluminum nitrate salts, precipitated gallium oxyhydroxide, gallium nitrate, gallium sulfate and mixtures thereof.

12. The process of claim 7 where the silicon source is selected from the group consisting of tetraethylorthosilicate, silicon alkoxides, fumed silica, colloidal silica, alkali silicate salts, precipitated silica and mixtures thereof.

13. The process of claim 7 where the reaction mixture is reacted at a temperature of about 95° C. to about 175° C. for a time of about 1 day to about 14 days.

14. The process of claim 7 where R is ETMA$^+$.

15. The process of claim 7 where R is DEDMA$^+$.

16. The process of claim 7 further comprising adding MeAPSO-83 seeds to the reaction mixture.

17. A hydrocarbon conversion process comprising contacting a hydrocarbon stream with a catalyst at hydrocarbon conversion conditions to generate at least one converted product, wherein the catalyst is selected from the group consisting of a crystalline microporous MeAPSO-83 material, a crystalline microporous modified MeAPSO-83 material and mixtures thereof, where MeAPSO-83 is a crystalline microporous metalloalumino(gallo)phosphosilicate material having a three-dimensional framework of [M$^{2+}$O$_{4/2}$]$^{2-}$, [EO$_{4/2}$]$^-$ and [PO$_{4/2}$]$^+$ and SiO$_{4/2}$ tetrahedral units and an empirical composition in the as synthesized form and on an anhydrous basis expressed by an empirical formula of:

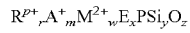

$$R^{p+}{}_rA^+{}_mM^{2+}{}_wE_xPSi_yO_z$$

where R is at least one quaternary organoammonium cation selected from the group consisting of ethyltrimethylammonium (ETMA$^+$), hexamethonium (HM$^{2+}$), choline [Me$_3$NCH$_2$CH$_2$OH]$^+$, trimethylpropylammonium, trimethylisopropylammonium, trimethylbutylammonium, tetraethylammonium (TMA$^+$), diethyldimethylammonium (DEDMA$^+$), tetraethylammonium (TEA$^+$), tetrapropylammonium (TPA$^+$) and mixtures thereof, "r" is the mole ratio of R to P and has a value of about 0.1 to about 1.5, "p" is the weighted average valence of R and varies from 1 to 2, A is an alkali metal such as Li$^+$, Na$^+$, K$^+$, Rb$^+$ and Cs$^+$ and mixtures thereof, "m" is the mole ratio of A to P and varies from 0.1 to 1.5, M is a divalent metal selected from the group Zn, Co, Mg, Mn and mixtures thereof, "w" is the mole ratio of M to P and varies from 0.5 to 0.9, E is a trivalent element selected from the group consisting of aluminum and gallium and mixtures thereof, "x" is the mole ratio of E to P and varies from 0.1 to 0.8, "w"≥"x", "y" is the mole ratio of Si to P and varies from 0.02 to about 2.5, and "z" is the mole ratio of O to P and has a value determined by the equation:

$$z=(m+p\cdot r+2\cdot w+3\cdot x+5+4\cdot y)/2$$

and is characterized in that it has the x-ray diffraction pattern having at least the d-spacings and intensities set forth in Table A:

TABLE A

| 2Θ | d (Å) | I/I$_0$ % |
|---|---|---|
| 6.79-6.61 | 12.80-13.36 | s-vs |
| 7.63-7.47 | 11.40-11.82 | m-vs |
| 13.34-12.95 | 6.63-6.83 | w-m |
| 13.68-13.28 | 6.47-6.66 | w-m |
| 14.95-14.63 | 5.92-6.05 | w-m |

TABLE A-continued

| 2Θ | d (Å) | I/I₀ % |
|---|---|---|
| 15.64-15.29 | 5.66-5.79 | w-m |
| 19.03-18.63 | 4.66-4.76 | m |
| 20.45-19.89 | 4.34-4.46 | m |
| 21.50-20.98 | 4.13-4.23 | m |
| 24.03-23.58 | 3.70-3.77 | w-m |
| 24.37-23.97 | 3.65-3.71 | m-s |
| 26.75-26.39 | 3.33-3.375 | w-m |
| 27.51-27.04 | 3.24-3.295 | w-m |
| 27.73-27.29 | 3.215-3.265 | w-m |
| 28.59-28.13 | 3.12-3.17 | w-m |
| 28.87-28.45 | 3.09-3.135 | w-m |
| 30.01-29.50 | 2.975-3.025 | m |
| 30.38-29.96 | 2.94-2.98 | m-s |
| 30.92-30.38 | 2.89-2.94 | m |
| 31.36-30.86 | 2.85-2.895 | w |
| 33.67-33.15 | 2.66-2.70 | w-m |
| 34.06-33.67 | 2.63-2.66 | w-m |
| 35.31-34.88 | 2.54-2.57 | w-m |
| 35.97-35.60 | 2.495-2.52 | w |
| 36.73-36.27 | 2.445-2.475 | w |
| 38.35-37.85 | 2.345-2.375 | w |
| 39.95-39.49 | 2.255-2.28 | w |
| 41.09-40.64 | 2.195-2.218 | w |

TABLE A-continued

| 2Θ | d (Å) | I/I₀ % |
|---|---|---|
| 43.25-42.76 | 2.09-2.113 | w-m |
| 43.74-43.17 | 2.068-2.094 | w |
| 49.84-49.27 | 1.828-1.848 | w-m | and the crystalline microporous modified MeAPSO-83 consists of a three-dimensional framework of $[M^{2+}O_{4/2}]^{2-}$, $[EO_{4/2}]^-$ and $[PO_{4/2}]^+$ and $SiO_{4/2}$ tetrahedral units derived from MeAPSO-83 via the modification processes of ammonia calcinations, ion-exchange, or any combination thereof.

18. The process of claim 17 wherein the hydrocarbon conversion process is selected from the group consisting of cracking, hydrocracking, alkylation, isomerization, polymerization, reforming, hydrogenation, dehydrogenation, transalkylation, dealkylation, hydration, dehydration, hydrotreating, hydrofining, hydrodenitrogenation, hydrodesulfurization, methanol to olefins, methanation, syngas shift process, olefin dimerization, oligomerization, dewaxing, and combinations thereof.

* * * * *